M. GIBBS.
Harvester Rake.
No. 84,818.
Patented Dec. 8, 1868.
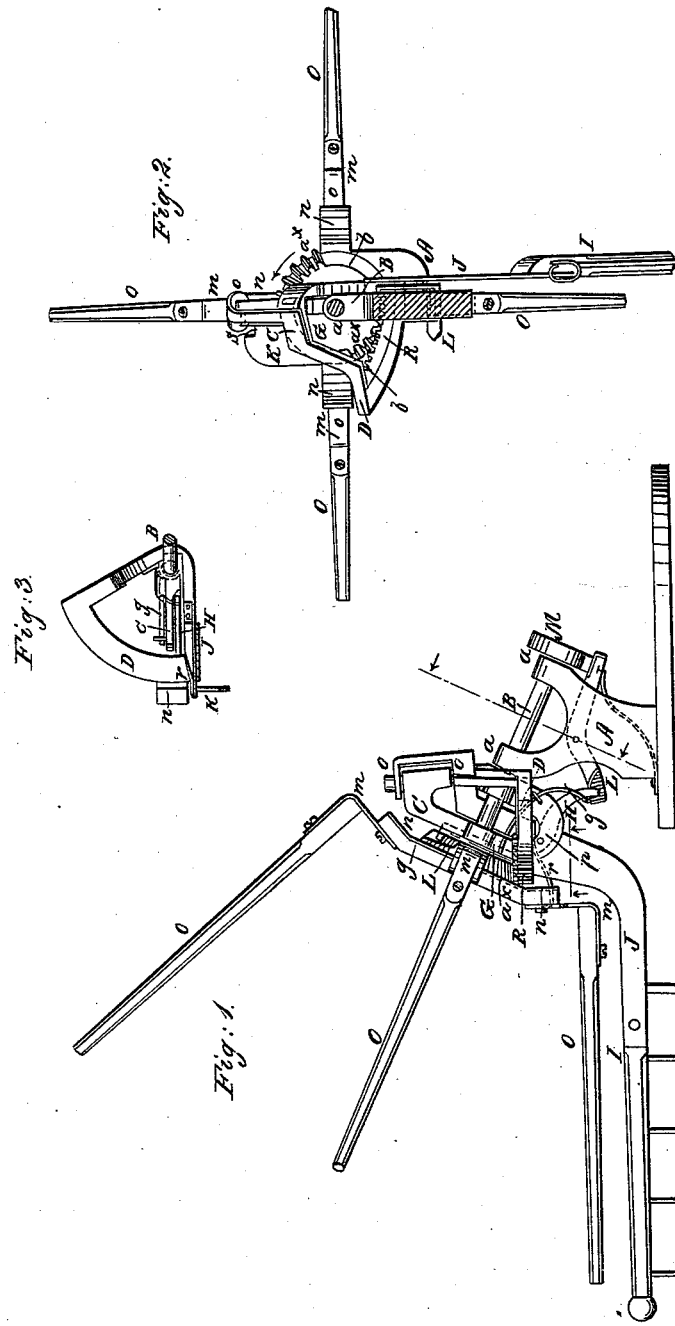

United States Patent Office.

MASON GIBBS, OF HOMER, MICHIGAN.

Letters Patent No. 84,818, dated December 8, 1868.

IMPROVEMENT IN HARVESTER-RAKES.

The Schedule referred to in these Letters Patent and making part of the same.

*To all whom it may concern:*

Be it known that I, MASON GIBBS, of Homer, in the county of Calhoun, and State of Michigan, have invented a new and useful Improvement in Harvesters; and I do hereby declare that the following is a full, clear, and exact description thereof, which will enable others skilled in the art to make and use the same, reference being had to the accompanying drawings, forming part of this specification, in which—

Figure 1 is a front view of my invention.

Figure 2, a transverse section of the same, taken in the line $x\ x$ of fig. 1.

Figure 3 is a longitudinal section of the same, taken in the line $y\ y$ of fig. 1, and looking upward.

Similar letters of reference indicate like parts.

This invention relates to a new and useful combination of a reel and rake for harvesters, as hereinafter fully shown and described, whereby a very simple and efficient automatic raking-attachment is obtained, and one which may be constructed and applied at a moderate cost.

In the accompanying sheet of drawings—

A, fig. 1, is a standard, which is secured to the frame of the harvester, or to the finger-bar thereof.

This standard has two bearings, $a\ a$, at its upper end, in which the reel-shaft B is fitted, and works.

This reel-shaft has an inclined position, as shown clearly in fig. 1, and to its upper end there is secured a pinion and reel-head, G, having short arms, $n\ n\ n\ n$, attached.

The cogs $a^\times$ of the pinion extend about a quarter of the way around, at opposite sides, leaving two blank spaces, $b\ b$, and at one end of each toothed or cogged portion, $a^\times$, there is a spur or projection, $g$, for a lever, H, to catch against.

O represents the reel-arms, which are attached to the short arms $n$ by means of right-angled brackets, $m$, and the short arms $n$ should have two or more bolt-holes, so that the reel-arms can be brought nearer to or carried further from the axis of the reel, and thus adapted to tall or short grain.

The short arms $n$ are slightly bent at their junction with the pinion and head G, in order to cause the lever, reel-arm, and each of the others, as they successively reach the lowest point in the path of their rotation, to assume a horizontal position.

Between the upper or most elevated bearing $a$, and the pinion and head G, there is fitted loosely on the reel-shaft B, a sleeve, C, the form of which is shown in fig. 1.

To this sleeve there is attached a sector, D, which is allowed to work freely on bearings $o\ o$ on the sleeve.

This sector has a toothed portion, R, into which the toothed or cogged portions $a^\times$ of G alternately mesh.

The lever H is pivoted to the sleeve C, as shown at $p$, fig. 1, and said lever has a spring, $q$, bearing against its lower end, which spring has a tendency to throw the outer end of the lever towards and keep it in contact with the pinion and hub G.

To the sector D, the rake-arm I is attached by a curved arm, J, and to the arm J there is attached a spring, $r$, which catches into a notch, $s$, in a plate, K, attached to the pinion and hub G, and holds the rake-arm and sleeve in proper position, while it passes down and in-front of the cutter-bar.

There are two of these plates K, provided with notches $s$. One of these is shown clearly in fig. 2.

L is a lever, attached to the standard A, and M is a cam on the shaft B, directly over the inner end of lever L.

The operation is as follows:

As the machine is drawn along, motion is communicated to the shaft B by means of any suitable gearing or belts, the reel-arms O, and pinion and head G, having a continuous rotary motion, and operating upon the grain in the usual manner.

The rake-arm I is carried around with the reel-arms, in front of the reel, from the top down to the bottom, where it comes in line with shaft B, at which point the cam strikes the lever L, and causes its outer end to rise, so that the lever H will come in contact with it, and said lever be actuated so that its end will be thrown out free from the spur or projection $g$ with which it was in contact.

By this means the sector D is detached from the pinion and head G, and, the latter still turning, one of its sets of teeth or cogs, $a^\times$, gears into the teeth R, and the rake-arm is thereby turned in a horizontal plane and over the platform of the machine, so as to rake the cut grain therefrom.

At the completion of this raking-movement, a spur or projection, $g$, comes in contact with the lever H, and the sector D and sleeve C are again turned, the rake-arm I consequently raised, and when it reaches a certain point it drops, so that the spring $r$ will catch into the notch $s$ of the uppermost plate K, and hold the rake-arm in position, or parallel with the reel O, until the rake-arm arrives in a vertical plane with shaft B, and underneath the same, when the cam M causes the lever H to be actuated, so as to free the sleeve C from the pinion and head G, and the rake-arm is swept around, as before, over the platform, to discharge the grain, then raised by the action of the pinion and head G against the lever H.

Thus it will be seen that by a very simple and efficient arrangement, I combine a raking-device with a reel, and which may be operated with but a small expenditure of power.

Having thus described my invention,

I claim as new, and desire to secure by Letters Patent—

The pinion and head G, placed on the reel-shaft B, in connection with the sleeve C, sector D, with the teeth R, levers H L, and the cam M, all arranged for joint operation, substantially in the manner as and for the purpose set forth.

The above specification of my invention signed by me, this 9th day of March, 1868.

<div style="text-align:right">MASON GIBBS.</div>

Witnesses:
GEORGE SEYMOUR,
A. J. MUNCEY.